United States Patent
Lucas et al.

(10) Patent No.: US 9,601,969 B2
(45) Date of Patent: *Mar. 21, 2017

(54) INHIBITING ROCKING OF LOADS DRIVEN BY PLURAL LEVERS

(71) Applicant: Bose Corporation, Framingham, MA (US)

(72) Inventors: Brian M. Lucas, Marblehead, MA (US); Johan H. Isaksson, Malmo (SE); Geoffrey C. Chick, Norfolk, MA (US)

(73) Assignee: Bose Corporation, Framingham, MA (US)

(*) Notice: Subject to any disclaimer, the term of this patent is extended or adjusted under 35 U.S.C. 154(b) by 258 days.

This patent is subject to a terminal disclaimer.

(21) Appl. No.: 14/200,876

(22) Filed: Mar. 7, 2014

(65) Prior Publication Data

US 2015/0256046 A1     Sep. 10, 2015

(51) Int. Cl.
*H02K 7/00* (2006.01)
*H02K 1/34* (2006.01)
(Continued)

(52) U.S. Cl.
CPC .............. *H02K 7/003* (2013.01); *H02K 1/34* (2013.01); *H02K 7/14* (2013.01); *H02K 35/02* (2013.01);
(Continued)

(58) Field of Classification Search
CPC ........ H04R 11/02; H02K 21/32; H02K 7/003; H02K 35/02
(Continued)

(56) References Cited

U.S. PATENT DOCUMENTS 1,718,357 A * 6/1929 Miller .................... H04R 11/00
                                                          381/162
1,756,201 A * 4/1930 Kiernan .................. H04R 7/12
                                                          381/162
(Continued)

FOREIGN PATENT DOCUMENTS

CN     203015064 U     6/2013
CN     203193871 U     9/2013
(Continued)

OTHER PUBLICATIONS

International Search Report and Written Opinion dated Aug. 4, 2014 for International application No. PCT/US2014/021559.
(Continued)

*Primary Examiner* — Jesse Elbin

(57) ABSTRACT

An apparatus includes a load and a first armature. A first lever mechanically couples the first armature and the load. Motion of the first armature causes the first lever to pivot about a first pivot axis. The apparatus also includes a second armature and a second lever that mechanically couples the second armature and the load. Motion of the second armature causes the second lever to pivot about a second pivot axis. At least one stator is provided for creating magnetic flux for the first and second armatures to interact with, thereby to drive motion of the load. The apparatus also includes a coupling mechanism that couples the first lever and the second lever. The coupling mechanism is arranged to encourage common mode oscillation of the first and second levers and inhibit differential mode oscillation of the first and second levers, thereby to inhibit rocking of the load.

12 Claims, 14 Drawing Sheets

(51) Int. Cl.
  *H02K 35/02* (2006.01)
  *H02K 7/14* (2006.01)
  *H04R 9/02* (2006.01)
  *H04R 11/02* (2006.01)

(52) U.S. Cl.
  CPC ............ *H04R 9/027* (2013.01); *H04R 11/02* (2013.01); *H04R 2400/07* (2013.01)

(58) Field of Classification Search
  USPC ....... 381/161, 162, 395, 417, 418, 421, 422, 381/431
  See application file for complete search history.

(56) References Cited

U.S. PATENT DOCUMENTS

| | | | |
|---|---|---|---|
| 1,823,512 A | 9/1931 | Ringel | |
| 1,973,277 A | 9/1934 | Barfield | |
| 2,035,104 A | 3/1936 | Thomas | |
| 2,078,469 A | 4/1937 | Thomas | |
| 2,245,511 A | 6/1941 | Turnbull | |
| 3,777,078 A | 12/1973 | Boutros-Attia et al. | |
| 3,836,733 A | 9/1974 | Cragg | |
| 3,937,904 A | 2/1976 | Parker | |
| 4,542,311 A | 9/1985 | Newman et al. | |
| 4,626,717 A | 12/1986 | Hensing et al. | |
| 5,216,723 A | 6/1993 | Froeschle et al. | |
| 5,802,189 A | 9/1998 | Blodget | |
| 6,405,599 B1 | 6/2002 | Patt | |
| 6,415,037 B1 | 7/2002 | Wang | |
| 7,247,957 B2 | 7/2007 | Dadd | |
| 8,139,813 B2 | 3/2012 | Kobayashi et al. | |
| 9,258,648 B2 | 2/2016 | Lucas et al. | |
| 2008/0247595 A1 | 10/2008 | Henry | |
| 2011/0243365 A1 | 10/2011 | Carlmark et al. | |
| 2011/0243366 A1 | 10/2011 | Carlmark et al. | |
| 2012/0106772 A1 | 5/2012 | Horigome et al. | |
| 2012/0248899 A1 | 10/2012 | Oommen et al. | |
| 2014/0064539 A1 | 3/2014 | Link et al. | |
| 2014/0270328 A1 | 9/2014 | Lucas et al. | |
| 2014/0334662 A1 | 11/2014 | Lin | |
| 2015/0256046 A1 | 9/2015 | Lucas et al. | |
| 2015/0256911 A1 | 9/2015 | Lucas et al. | |
| 2015/0256936 A1 | 9/2015 | Lucas et al. | |

FOREIGN PATENT DOCUMENTS

| | | |
|---|---|---|
| GB | 212648 A | 3/1924 |
| GB | 1124830 A | 8/1968 |
| JP | S6212300 | 1/1987 |
| JP | 2009225091 A | 10/2009 |

OTHER PUBLICATIONS

International Search Report and Written Opinion dated Aug. 4, 2014 for International application No. PCT/US2014/021592.
International Search Report and Written Opinion dated Jun. 2, 2015 for International application No. PCT/US2015/018279.
International Search Report and Written Opinion dated May 26, 2015 for International application No. PCT/US2015/018699.
International Search Report and Written Opinion dated May 20, 2015 for International application No. PCT/US2015/018702.
International Search Report and Written Opinion dated May 29, 2015 for International application No. PCT/US2015/018714.
Http://bushingsinc.com/index.php/bushings-inc-products-lines/rubber-flex-bushings; retrieved 2007.

\* cited by examiner

INHIBITING ROCKING OF LOADS DRIVEN BY PLURAL LEVERS

BACKGROUND

This disclosure relates to apparatus (e.g., a loudspeaker) that employ a coupling mechanism for coupling movements of a plurality of levers which drive a common load (e.g., an acoustic diaphragm) such that rocking behavior of the load is inhibited.

SUMMARY

This disclosure is based, in part, on the realization that a coupling mechanism can be utilized to couple movements of a plurality of levers so as to inhibit differential mode oscillation of the levers that might otherwise lead to rocking behavior of a commonly driven load.

In one aspect, an apparatus includes a load and a first armature. A first lever mechanically couples the first armature and the load. The first lever is configured such that motion of the first armature causes the first lever to pivot about a first pivot axis. The apparatus also includes a second armature and a second lever that mechanically couples the second armature and the load. The second lever is configured such that motion of the second armature causes the second lever to pivot about a second pivot axis. At least one stator is provided for creating magnetic flux for the first and second armatures to interact with, thereby to drive motion of the load. The apparatus also includes a coupling mechanism that couples the first lever and the second lever. The coupling mechanism is arranged to encourage common mode oscillation of the first and second levers and inhibit differential mode oscillation of the first and second levers, thereby to inhibit rocking of the load.

Implementations may include one of the following features, or any combination thereof.

In some implementations, the coupling mechanism couples the first and second levers via the first and second armatures.

In certain implementations, the coupling mechanism is secured to the first and second armatures or to the first and second levers via adhesive, ultrasonic bonding, mechanical interlock, or combinations thereof.

In some implementations, the coupling mechanism is secured to the first and second armatures or to the first and second levers via a mold-in-place process.

In certain implementations, the coupling mechanism comprises an elastomer.

In some implementations, the elastomer is secured to at least two surfaces of the first armature and to at least two surfaces of the second armature.

In certain implementations, the elastomer is secured to at least two surfaces of the first lever and to at least two surfaces of the second lever.

In some implementations, the coupling mechanism includes first and second gears with interlocking teeth which slave motion of the first and second levers.

In certain implementations, the coupling mechanism includes a first gear that includes a first plurality of teeth connected to the first lever and a second gear that includes a second plurality of teeth which are connected to the second lever and which mesh with the first plurality of teeth thereby slaving motion of the first and second levers.

In some implementations, the coupling mechanism includes a flexure.

In certain implementations, the flexure has a first end secured to the first lever and a second end secured to the second lever.

In some implementations, the flexure has a first end secured to the first armature and a second end secured to the second armature.

In certain implementations, the flexure is secured to diagonally opposed surfaces of the first and second levers.

In some implementations, the flexure is secured to diagonally opposed surfaces of the first and second armatures.

In certain implementations, the coupling mechanism includes a coil spring having a first end secured to the first lever and a second end secured to the second lever.

In some implementations, the coupling mechanism includes a coil spring having a first end secured to the first armature and a second end secured to the second armature.

In certain implementations, the levers are configured and arranged for rotation in opposite directions of rotation relative to each other.

In some implementations, the levers are arranged to move the load in a pistonic motion.

In certain implementations, the apparatus includes a loudspeaker.

In some implementations, the load includes an acoustic diaphragm.

In certain implementations, the at least one stator includes a first stator for creating magnetic flux for the first armature to interact with, and a second stator for creating magnetic flux for the second armature to interact with.

In some implementations, the at least one stator includes a single, common stator defining an air gap within which both of the first and second armatures are disposed. The common stator is configured for creating magnetic flux across the air gap for the first and second armatures to interact with, thereby to drive motion of the load.

Another aspect features a method that includes passing electrical current through coils of at least one stator to generate magnetic flux which a plurality of armatures interact with causing a plurality of levers to rotate about respective pivot axes, and thereby driving motion of an acoustic diaphragm coupled to the plurality of armatures via the plurality of levers. The levers are coupled to each other via a coupling mechanism which slaves movements of the levers to each other such that rocking of the acoustic diaphragm is inhibited.

Implementations may include one of the above features, or any combination thereof.

In yet another aspect, a loudspeaker includes an acoustic diaphragm, a plurality of armatures, and a plurality of levers each coupling an associated one of the armatures to the acoustic diaphragm and each configured to pivot about a respective pivot point. The loudspeaker also includes at least one stator for creating magnetic flux for the plurality of armatures to interact with, thereby to drive piston motion of the acoustic diaphragm in a first axial direction, and a coupling mechanism coupling the plurality of levers. The coupling mechanism slaves the levers to each other so that forces applied on the acoustic diaphragm by the levers in the first axial direction are in phase, thereby inhibiting rocking of the acoustic diaphragm.

Implementations may include one of the above features, or any combination thereof.

Other aspects, features, and advantages are in the description, drawings, and claims.

DETAILED DESCRIPTION

Figure 1A:
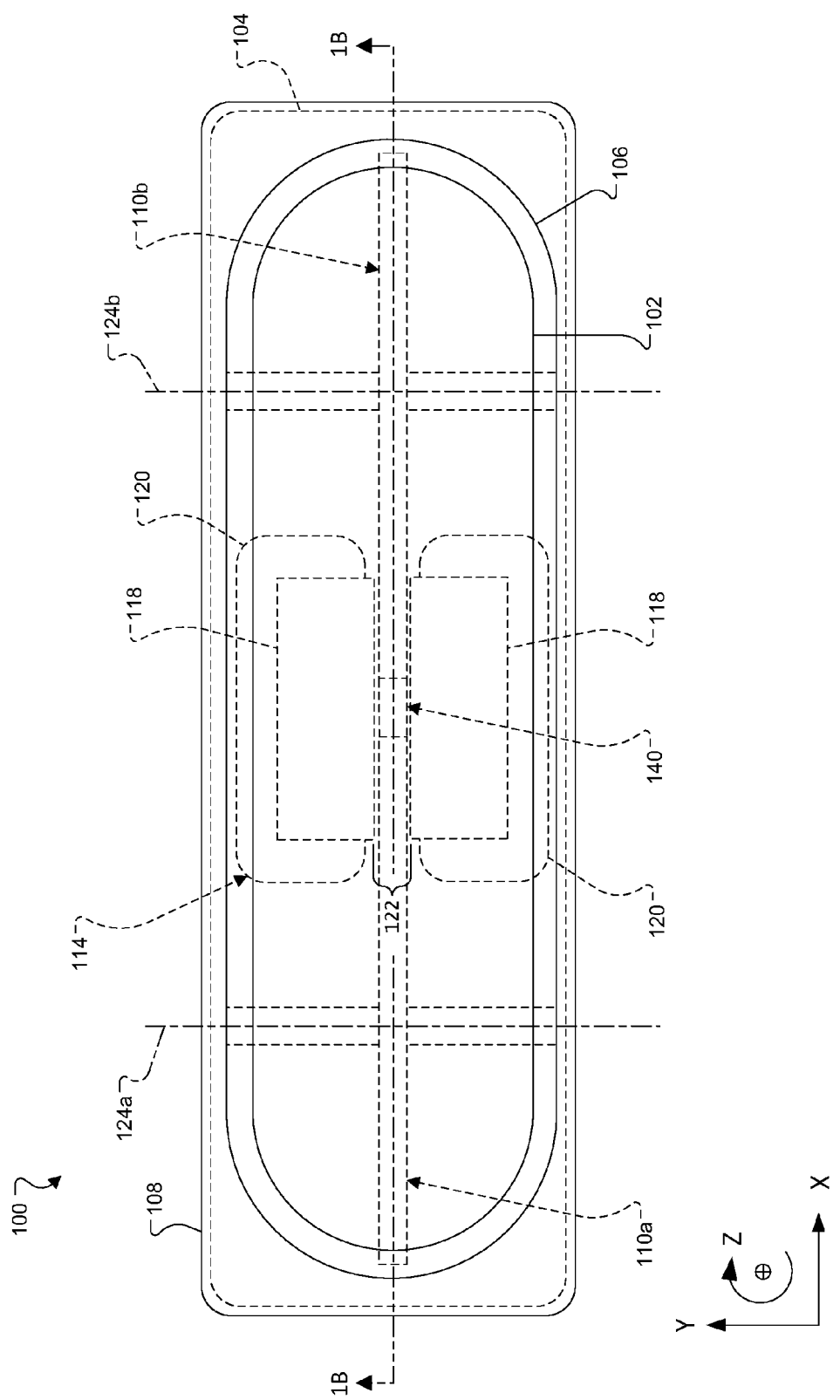
FIG. 1A is a top plan view of a loudspeaker that employs a coupling mechanism for coupling movements of a pair of levers which drive an acoustic diaphragm.
Figure 1B:
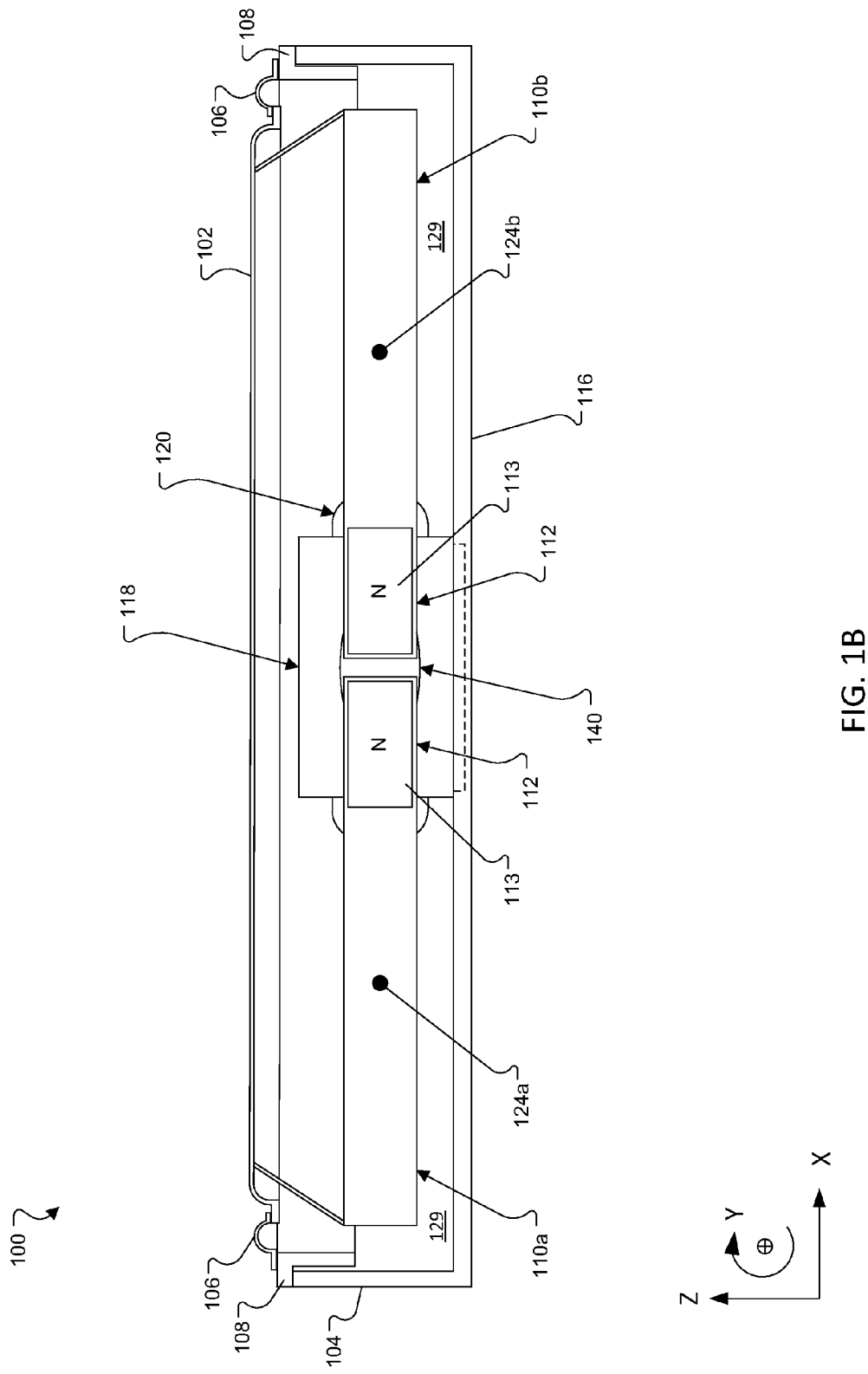
FIG. 1B is a cross-sectional side view of the loudspeaker of FIG. 1A, taken along line 1B-1B.

Referring to FIGS. 1A and 1B, an apparatus, in this example a loudspeaker 100, includes a mechanical load, in this example an acoustic diaphragm 102 (e.g., a cone type speaker diaphragm, also known simply as a "cone"), that is mounted to an enclosure 104, which may be metal, plastic, or other suitable material, by a surround 106, which functions as a pneumatic seal and as a suspension element. For example, in some instances the surround 106 is mounted to a frame 108 and the frame 108 is connected to the enclosure 104. The loudspeaker 100 also includes a pair of levers (i.e., first and second levers 110a, 110b) each of which couples an associated armature 112 (FIG. 1B) to the acoustic diaphragm 102 for transmitting motion of the armatures 112 to the acoustic diaphragm 102 to cause the acoustic diaphragm 102 to move, relative to the enclosure 104.

Each of the armatures 112 includes a permanent magnet 113 (FIG. 1B). In the illustrated example, both of the armatures 112 are driven by a single, common stator 114, which provides a magnetic flux for the permanent magnets 113 to interact with, thereby to drive motion of the acoustic diaphragm 102. The stator 114 can be secured to a bottom wall 116 of the enclosure 104 (e.g., with an adhesive). Alternatively or additionally, the stator 114 could be affixed to the frame 108.

The stator 114 can include a pair of U-shapes cores 118 of high magnetic permeability material, such as soft iron. Each core 118 includes a coil 120 of electrically conductive material wound about it. The cores 118 are arranged adjacent to each other and define an air gap 122 (FIG. 1A) therebetween, which is substantially filled by the armatures 112. The air gap 122 is a single, common air gap that is shared by both armatures 112.

Current in coils 120 produces a magnetic flux across the air gap 122. The magnetic flux interacts with the permanent magnets 113 of the armatures 112 to drive the motion of the acoustic diaphragm 102. The combination of the armatures 112, the cores 118, and the coils 120 form a moving magnet motor. The interaction of the magnetic field in the air gap 122 due to current flowing in the coils 120 and magnetic fields of the magnets 113 apply force to the magnets 113 in a non-contact manner. Force from the magnets 113 is coupled structurally to the levers 110a, 110b and ultimately to the acoustic diaphragm 102.

Each of the levers 110a, 110b is pivotally connected to a mechanical ground reference, such as the enclosure 104 or the frame 108 of the loudspeaker 100 such that the levers 110a, 110b each move in an arcuate path about respective pivot axes 124a, 124b. The armatures 112 and the stator 114 are positioned beneath the acoustic diaphragm 102 with the pivot axes 124a, 124b being arranged outboard of the armatures 112. That is, the armatures 112 are disposed between the pivot axis 124a of the first lever 110a and the pivot axis 124b of the second lever 110b.

Figure 2:
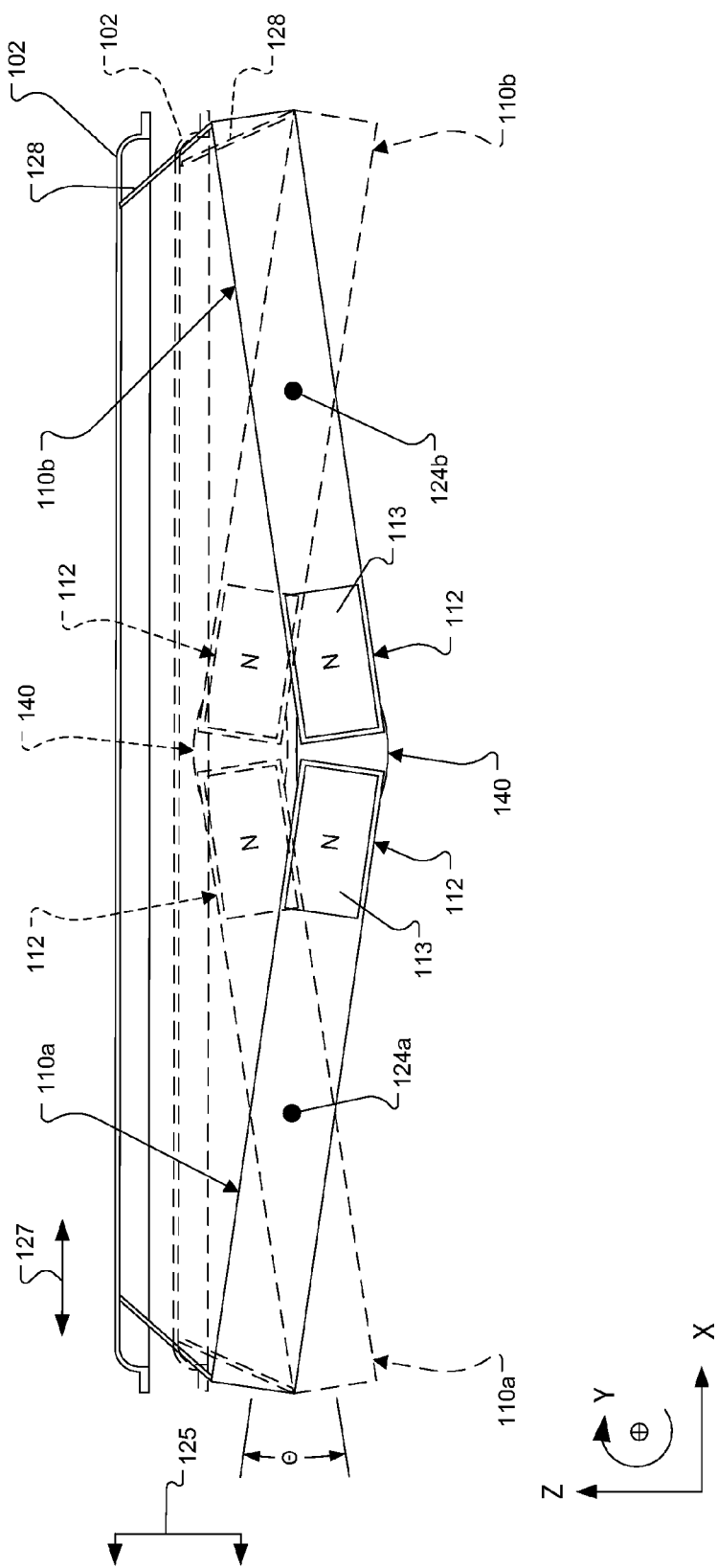
FIG. 2 illustrates oscillatory, arcuate movement of the levers and pistonic movement of the acoustic diaphragm of the loudspeaker of FIG. 1A.

Referring now to FIG. 2, the levers 110a, 110b, in combination with the interaction between the armatures 112 and the stator 114 (not shown in FIG. 2), move the acoustic diaphragm 102 in a pistonic motion (as indicated by arrow 125, FIG. 2). Relative lateral motion (arrow 127, FIG. 2) between the acoustic diaphragm 102 and the connection points of the levers 110a, 110b is proportional to 1+cosine of the angle θ times the length of the lever 110a, 110b (measured from the pivot axis 124a, 124b to the point where the lever 110a, 110b is attached to the connector 128).

As the angle of rotation θ of the levers 110a, 110b increases so does the relative lateral movement between the acoustic diaphragm 102 and the connection points of the levers 110a, 110b to the acoustic diaphragm 102. To accommodate such motion, connectors 128 which allow for at least two-degrees of movement (i.e., relative rotational movement and relative lateral movement) can be used to connect the levers 110a, 110b to the acoustic diaphragm 102. In this regard, each connector 128 can be implemented as a linkage, a flexure formed of a flexure material, such as high fatigue strength stainless steel, an elastomeric connection (such as a block of elastomer), or some combination thereof. The levers 110a, 110b drive the acoustic diaphragm 102 between a fully extended position (shown in solid lines in FIG. 2), in which the acoustic diaphragm 102 extends outwardly away from the enclosure 104 (not shown in FIG. 2), and a fully retracted position (shown in dashed lines in FIG. 2), in which the acoustic diaphragm 102 is drawn inward toward a chamber 129 (FIG. 1B) of the enclosure 104.

Notably, the levers 110a, 110b are coupled together via a coupling mechanism 140 that is arranged to inhibit "rocking" behavior of the acoustic diaphragm 102. Rocking behavior is rotation about the Y-axis of the acoustic diaphragm 102. The coupling mechanism 140 is arranged to encourage common mode oscillation of the levers 110a, 110b and inhibits differential mode oscillation of the levers 110a, 110b. That is, the coupling mechanism 140 slaves the levers 110a, 110b to each other so that the components of the forces applied on the acoustic diaphragm 102 by the levers 110a, 110b in the Z-direction are in phase. In phase force application in the Z-direction at different points on the acoustic diaphragm 102 stimulates desired planar, non-rocking motion of the acoustic diaphragm 102.

Figure 3:
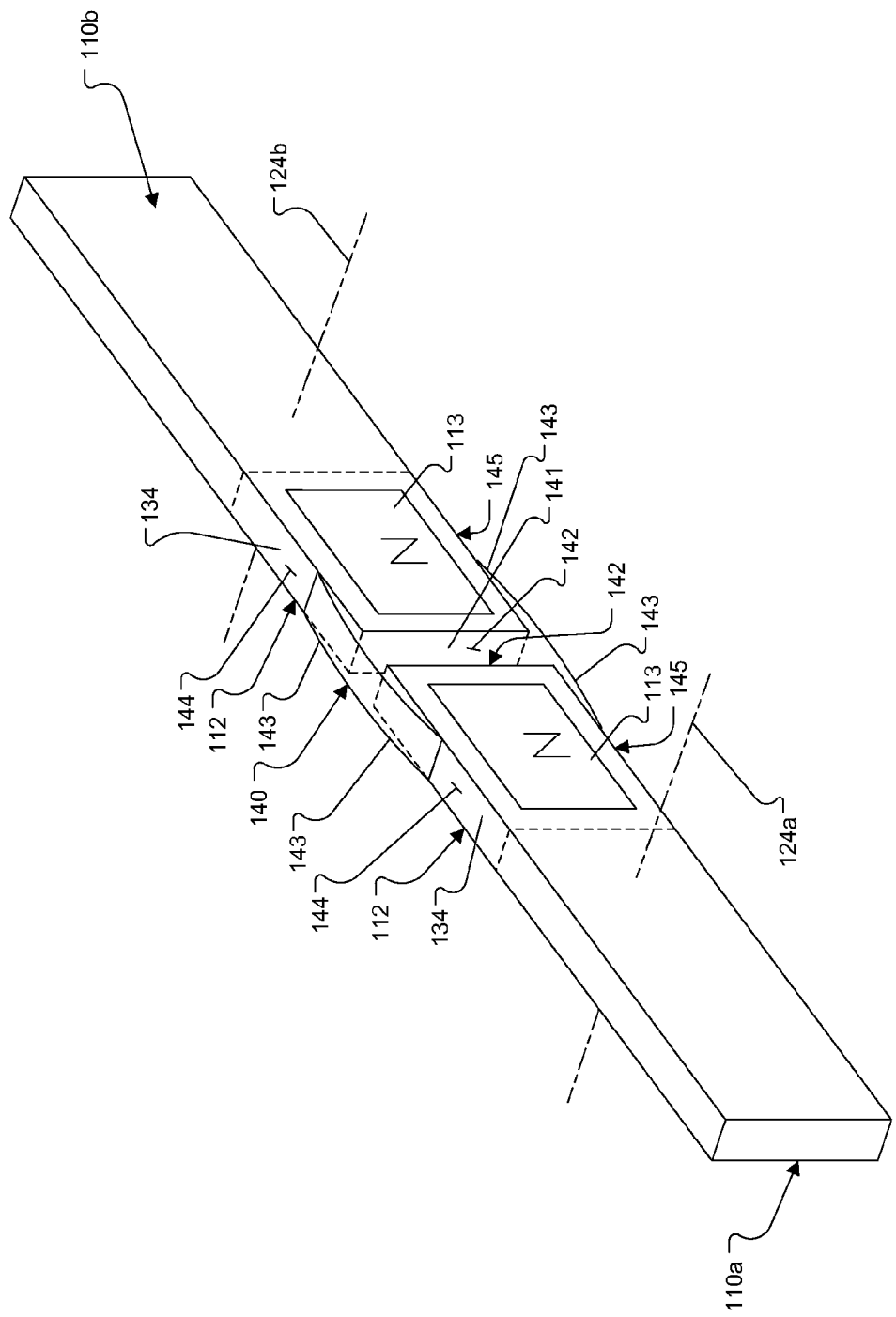
FIG. 3 is a perspective view of the levers of the loudspeaker of FIG. 1A.

As shown in FIG. 3, each of the armatures 112 includes a magnet carrier 134 which supports the permanent magnet 113. The magnets 113 can be secured in their respective magnet carriers 134 with an adhesive, a mechanical interface, snap features, or combinations thereof, etc. The levers 110a, 110b can be formed of a metal, such as aluminum; a glass-filled plastic; or other suitable low mass high stiffness materials. In some cases, the magnet carrier 134 is formed integrally with the associated lever 110a, 110b. The magnets 113 are arranged such that like poles (north poles shown in FIG. 3) face the same core 140 of the stator 114 (FIG. 1A), such that the magnets 113 are polarized in the same direction in the air gap 122 (FIG. 1A).

The coupling mechanism 140 extends between and connects the armatures 112. The coupling mechanism 140 may consist of an elastomer (e.g., a silicone elastomer) that is bonded to the armatures 112. In some cases, the elastomer can be formed between the armatures 112 in a mold-in-place process. In the illustrated example, the coupling mechanism 140 includes a first portion 141 that is bonded to respective distal end surfaces 142 of the armatures 112. The coupling mechanism 140 also includes over mold portions 143 which are bonded to top and bottom surfaces 144, 145 of the armatures 112. Over molding onto the top and bottom surfaces 144, 145 places the ends (the over molded portions 143) of the coupling mechanism 140 in shear, which can help to inhibit peeling and thereby make the coupling more reliable. While elastomer is specifically mentioned above, other suitable coupling materials can be used to slave the levers 110a, 110b to each other. For example, foam can be a suitable alternative to the elastomer.

Other Implementations

While an implementation has been described in which the coupling mechanism is formed and bonded in a mold-in-place process, the coupling mechanism may alternatively be formed in a separate molding process and then bonded to the levers using an adhesive (e.g., pressure sensitive adhesive), ultrasonic bonding, or mechanical interlocking.

Although an implementation has been described in which a pair of armatures are driven by a single, common stator, the armatures may instead be driven by separate stators.

Figure 4A:
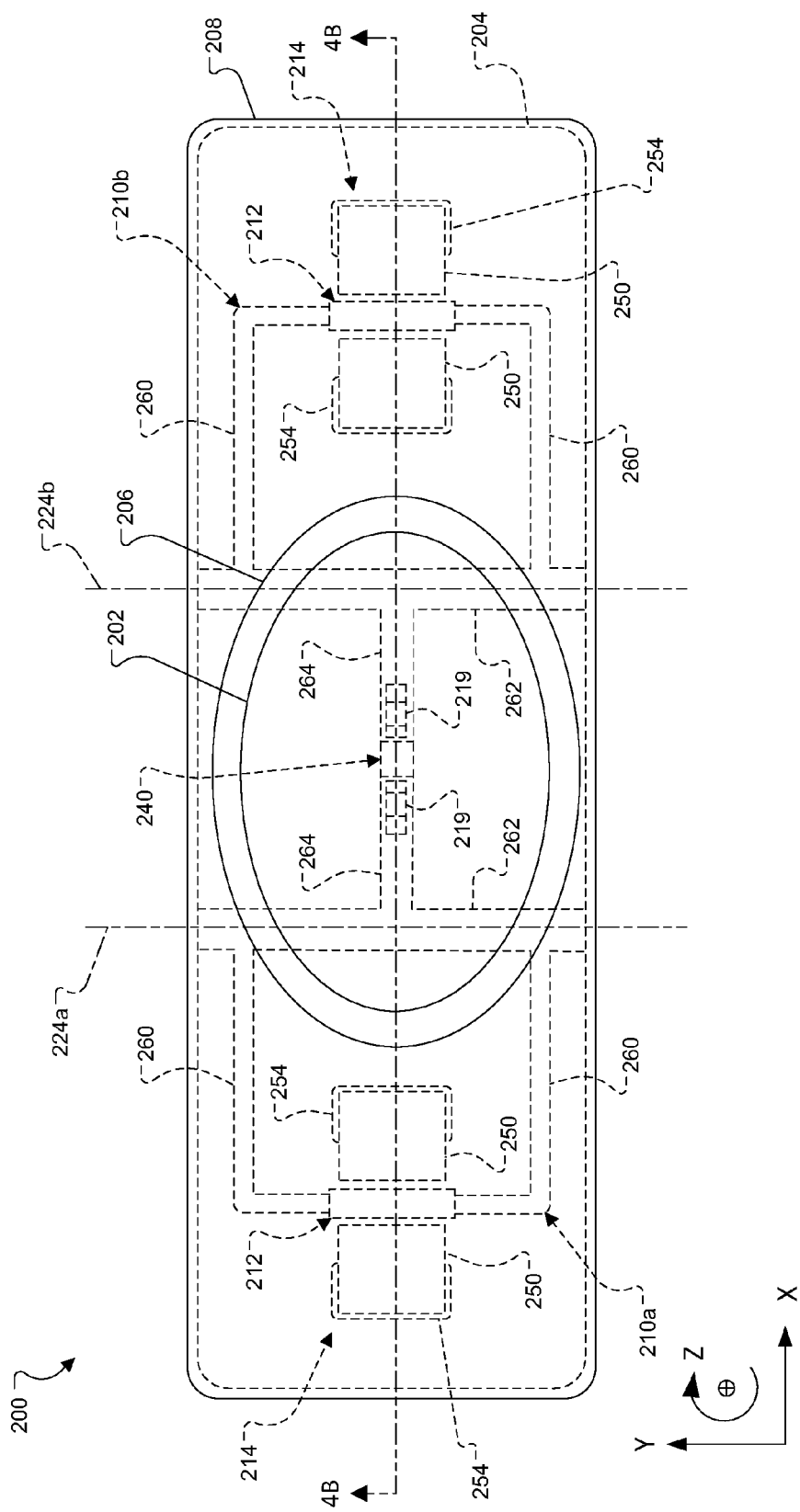
FIG. 4A is a top plan view of another implementation of a loudspeaker that includes a coupling mechanism for coupling movements of a pair of levers which drive an acoustic diaphragm.
Figure 4B:
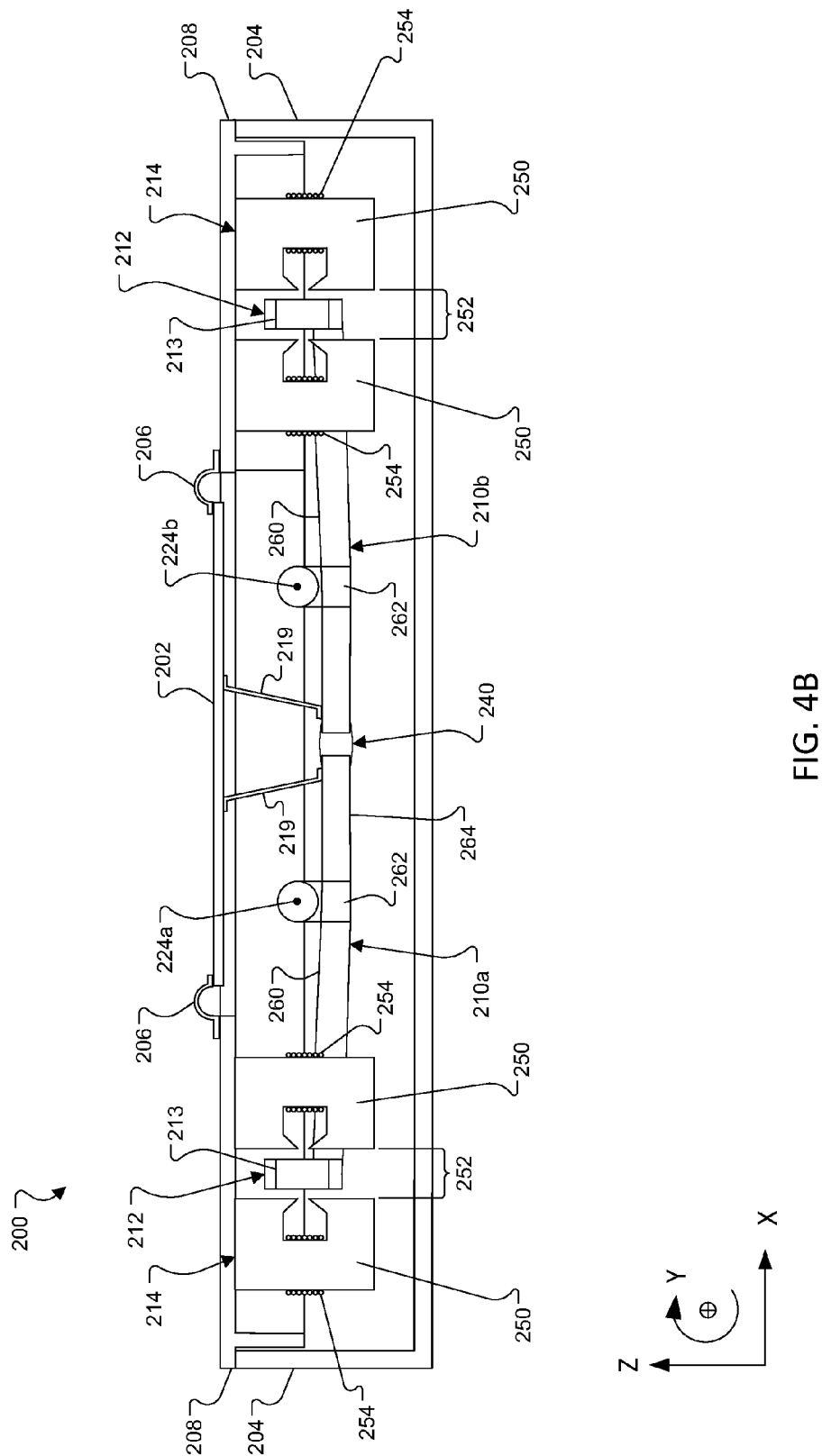
FIG. 4B is a cross-sectional side view of the loudspeaker of FIG. 4A, taken along line 4B-4B.

FIGS. 4A and 4B illustrate another implementation of an apparatus (e.g., a loudspeaker 200) that includes a coupling mechanism 240 for slaving movements of a pair of levers 210a, 210b, thereby to inhibit rocking behavior of a common load (e.g., an acoustic diaphragm 202). In the implementation illustrated in FIGS. 4A and 4B, the levers 210a, 210b are configured to pivot about respective pivot axes 224a, 224b. The pivot axes 224a, 224b are arranged inboard of a pair of armatures 212, each of the armatures being associated with a corresponding one of the levers 210a, 210b.

In the illustrated example, an acoustic diaphragm 202 is mounted to an enclosure 204 by a surround 206. The surround 206 is mounted to a frame 208 and the frame 208 is connected to the enclosure 204. The levers 210a, 210b couple the armatures 212 to the acoustic diaphragm 202 for transmitting motions of the armatures 212 to the acoustic diaphragm 202.

Each of the armatures 212 includes a permanent magnet 213 (FIG. 4B), and each armature 212 is driven by an associated stator 214. The stators 214 provide magnetic flux for the permanent magnets 213 to interact with, thereby to drive motion of the acoustic diaphragm 202. Each of the stators 214 includes a pair of cores 250, which together define an air gap 252 (FIG. 4B) within which an associated one of the armatures 212 is disposed. The cores can be secured to the frame 208 (e.g., with an adhesive).

Each core 250 includes a coil 254 of electrically conductive material wound about it. Current in coils 254 produce magnetic flux across the air gaps 252. The magnetic flux interacts with the permanent magnets 213 of the armatures 212 to drive the motion of the acoustic diaphragm 202. The coupling mechanism 240 similarly functions to inhibit rocking of the acoustic diaphragm 202.

Each lever 210a, 210b includes a pair of support arms 260 that support the armature 212. A cross-member 262 connects the support arms 260 to a lever arm 264. Each lever arm 264 is connected to the acoustic diaphragm 202 via connector 219 (FIG. 4B), such as a hinge or flexure, which allows the levers 210a, 210b to move relative to the acoustic diaphragm 202, thereby to allow the acoustic diaphragm 202 to move in a pistonic motion, rather than following the arcuate path of the levers 210a, 210b.

Figure 5:
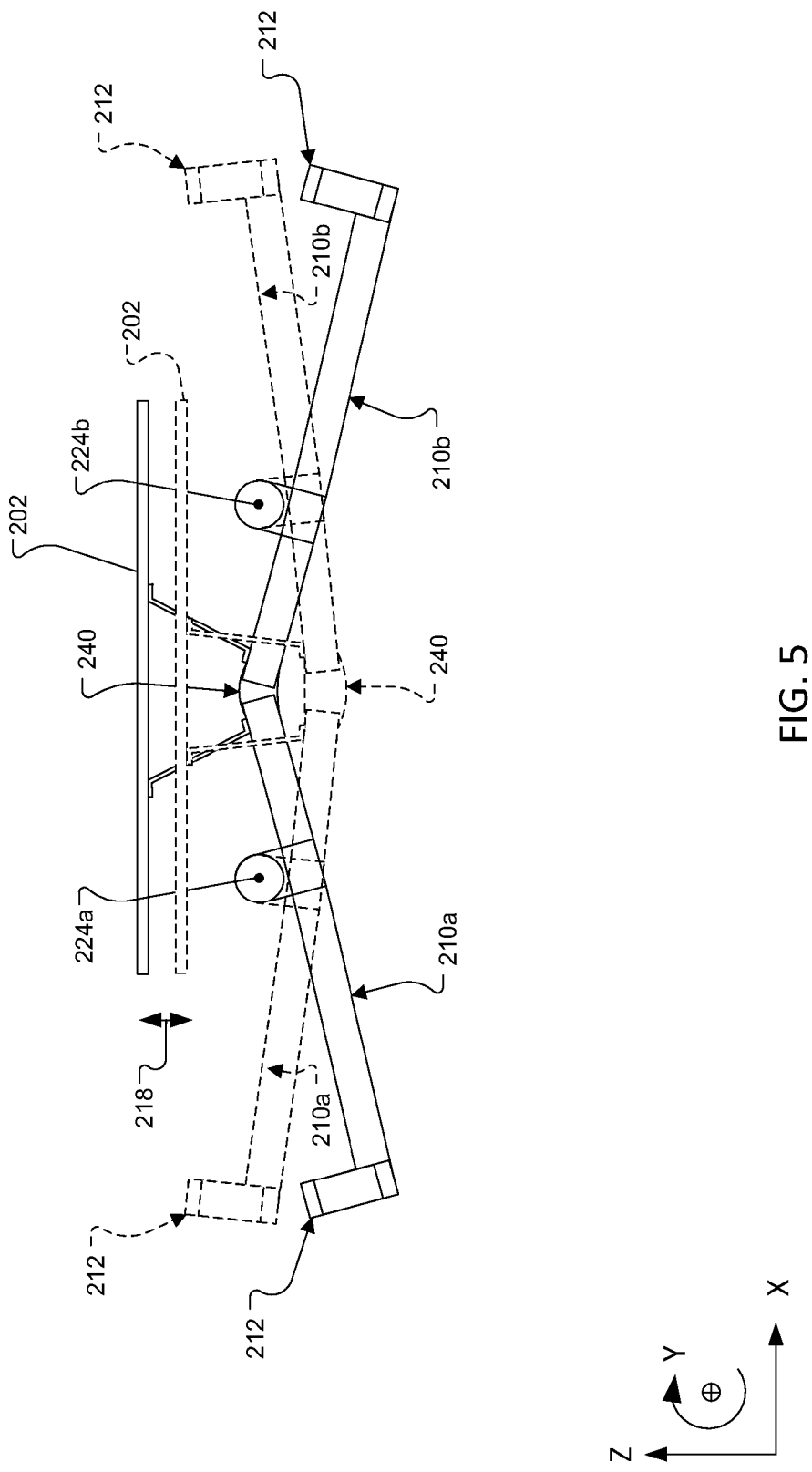
FIG. 5 illustrates oscillatory, arcuate movement of the levers and pistonic movement of the acoustic diaphragm of the loudspeaker of FIG. 1A.

Referring now to FIG. 5, the levers 210a, 210b, in combination with the interaction between the armatures 212 and the stator 214 (not shown in FIG. 5), moves the acoustic diaphragm 202 in a pistonic motion (as indicated by arrow 218). Notably, in the configuration illustrated in FIGS. 4A, 4B, and 5, distal ends of the levers 210a, 210b are coupled via a coupling mechanism 240 that slaves movements of the levers 210a, 210b to each other so as to inhibit rocking behavior of the acoustic diaphragm 202. The coupling mechanism can, for example, have a structure as described above with respect to FIG. 3. More specifically, the coupling mechanism 240 can include a first portion 241 that is bonded to respective distal end surfaces of the lever arms 264, and over mold portions 243 that are bonded to top and bottom surfaces of the lever arms 264. This arrangement can provide for a more direct coupling of the levers as compared to the arrangement described above in which coupling mechanism coupled the levers via the armatures.

The coupling mechanism 240 can include an elastomer that can be formed and bonded to the levers 210a, 210b via a mold-in-place process. Alternatively or additionally, the coupling mechanism 240 can be secured to the levers 210a, 210b using some other means such as adhesive, ultrasonic bonding, mechanical interlock, etc.

Figure 6:
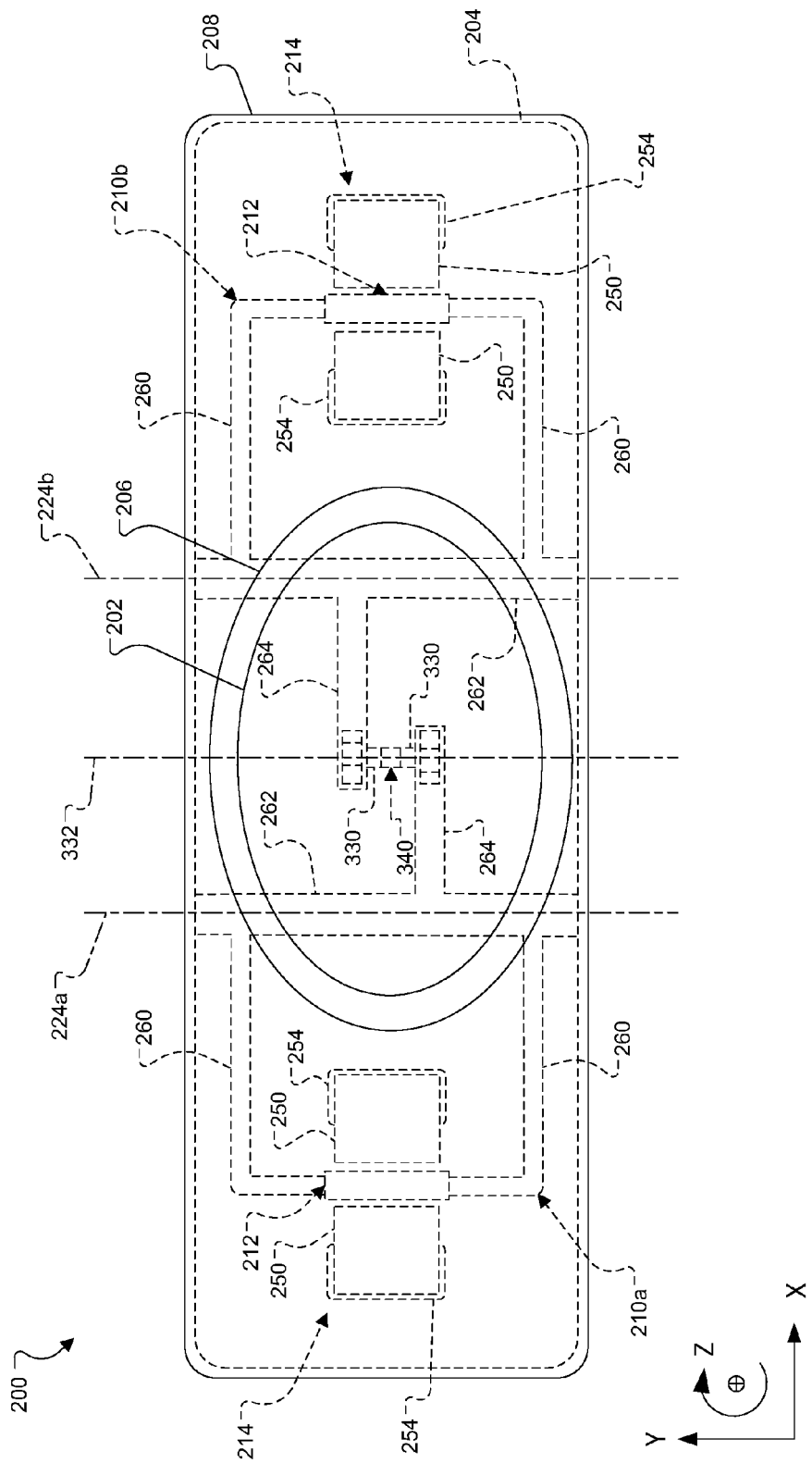
FIG. 6 is a top plan view of a third implementation of a loudspeaker that includes a coupling mechanism for coupling movements of a pair of levers which drive an acoustic diaphragm.

FIG. 6 illustrates another implementation of an apparatus (e.g., a loudspeaker 300) in which the lever arms 264 are arranged off-center and in an overlapping configuration in which side surfaces of the lever arms 264 are adjacent each other. Various reference numbers in FIG. 6 refer to correspondingly numbered elements in FIG. 4A.

In the implementation illustrated in FIG. 6, each of the lever arms 264 includes a protrusion 330 which extends outwardly from a side surface of the lever arm 264. The protrusions 330 may be formed integrally with their respective lever arm 264. The respective protrusions 330 align with each other along an axis 332. A coupling mechanism 340 extends between and is bonded to the protrusions 330. The coupling mechanism 340 is arranged to encourage common mode oscillation of the levers 110a, 110b and inhibits differential mode oscillation of the levers, thereby inhibiting rocking of the acoustic diaphragm 202.

The coupling mechanism 340 may consist of an elastomer that is bonded to the protrusions 330 with an adhesive. Alternatively or additionally, the coupling mechanism 340 can be secured to the levers 210a, 210b in a mold-in-place process, or using other means such as ultrasonic bonding, mechanical interlocking, etc.

Figure 7A:
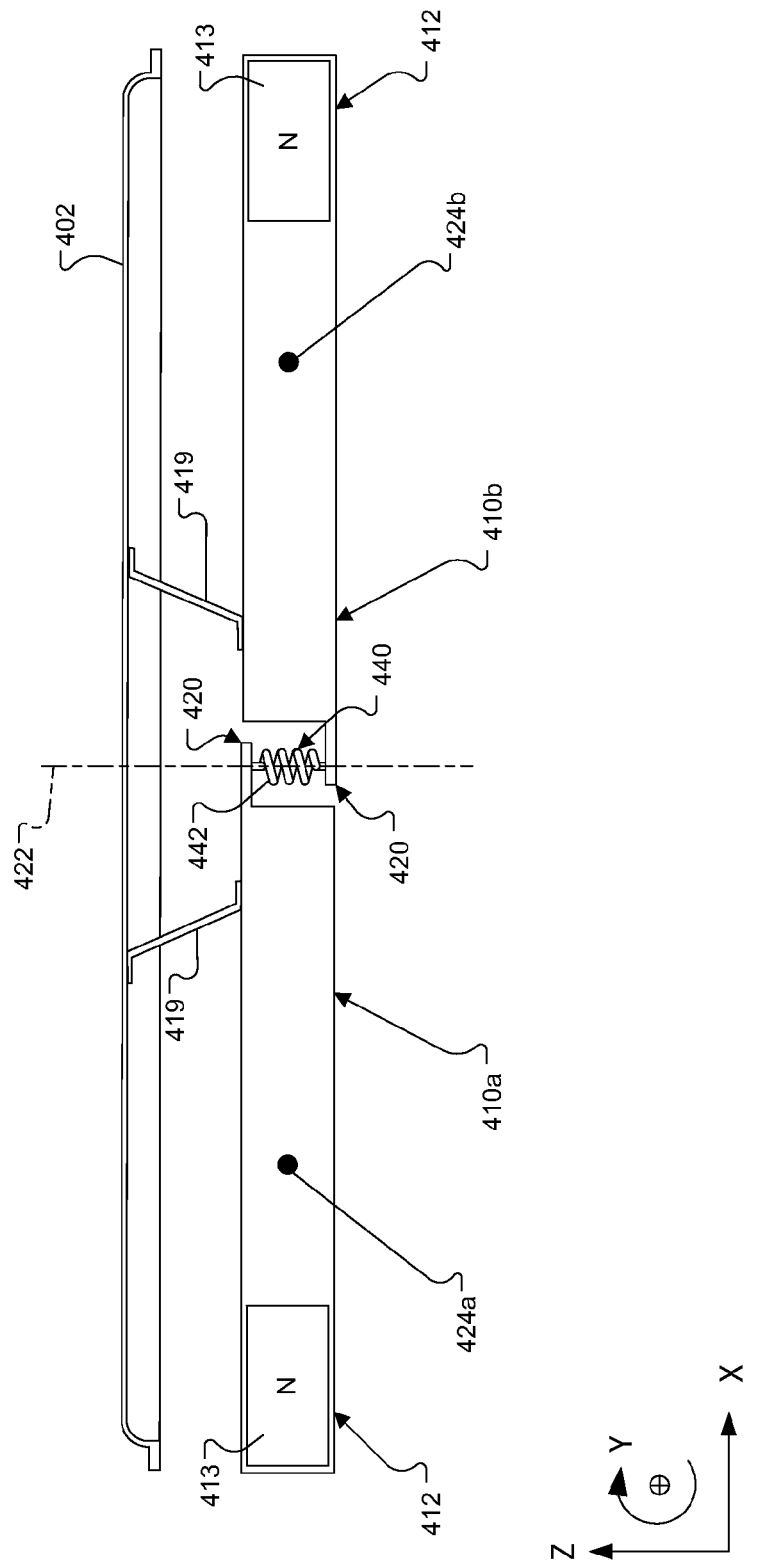
FIG. 7A is a schematic side view of pair of levers which couple a pair of armatures to an acoustic diaphragm and which are coupled together with a coupling mechanism in the form of a helical (coil) spring.

FIG. 7A illustrates another implementation of a coupling mechanism 440 that can be used to slave movements of a pair of levers 410a, 410b. In the implementation illustrated in FIG. 7A, the levers 410a, 410b are configured to pivot about respective pivot axes 424a, 424b. As in the examples described above, the levers 410a, 410b each couple an associated armature 412 with a load (e.g., an acoustic diaphragm 402). Each lever 410a, 410b is connected to the acoustic diaphragm 402 via connector 419, such as a hinge or flexure, which allows the levers 410a, 410b to move relative to the acoustic diaphragm 402, thereby to allow the acoustic diaphragm 402 to move in a pistonic motion, rather than following the arcuate path of the levers 410a, 410b. Permanent magnets 413 of the armatures 412 interact with magnetic flux provided by stators (not shown in FIG. 7A) to drive the motion of the levers 410a, 410b, which, in turn, drive pistonic motion of the acoustic diaphragm 402.

Each of levers 410a, 410b includes a tab 420 which extends from a distal end of the lever 410a, 410b. The levers 410a, 410b are arranged such that the tabs 420 overlap each other along an axis 422 that extends in the direction of the motion (the Z-direction) of the acoustic diaphragm 402. The coupling mechanism 440 includes a coil (helical) spring 442. One end of the spring 442 is attached to a first one of the tabs 420 and an opposite end of the spring 442 is attached to the other one of the tabs 420 such that, in the neutral (rest) position, the spring 442 is arranged with its central axis in the Z-direction.

The coupling mechanism 440 is arranged to inhibit rocking of the acoustic diaphragm 402. In this regard, the coupling mechanism 440 is arranged to encourage common mode oscillation of the levers 410a, 410b and inhibits differential mode oscillation of the levers 410a, 410b. That is, the coupling mechanism 440 slaves the levers 410a, 410b to each other so that the components of the forces applied on the acoustic diaphragm 402 by the levers 410a, 410b in the Z-direction are in phase. In phase force application in the Z-direction at different points on the acoustic diaphragm 402 stimulates desired planar, non-rocking motion of the acoustic diaphragm 402.

Notably, the spring 442 is arranged so as to provide relatively high stiffness in the Z-direction and relatively low stiffness in the X-direction. The key here is that the spring 442 is arranged such that differential mode oscillation of the levers 410a, 410b tensions the spring 442 quickly, while common mode oscillation does not implement much stretching of the spring 442.

Figure 7B:
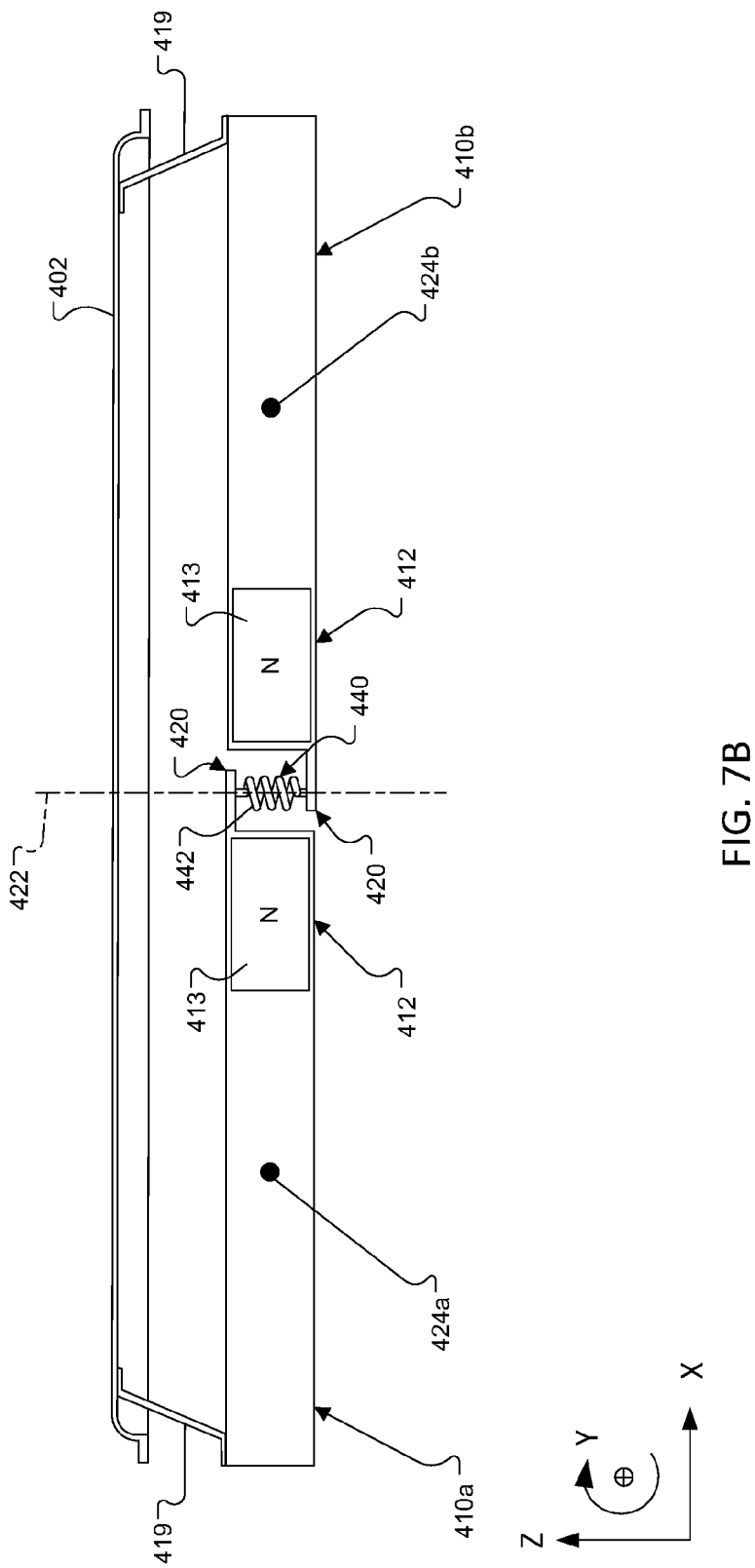
FIG. 7B is a schematic side view of an alternative arrangement of a pair of levers which couple a pair of armatures to an acoustic diaphragm and which are coupled together with a coupling mechanism in the form of a helical (coil) spring.

While FIG. 7A illustrates an inboard arrangement, in which the pivot axes are arranged between of the armatures, the helical spring configuration is also applicable to outboard arrangements in which the armatures 412 are disposed between the pivot axis 424a of the first lever 410a and the pivot axis 424b of the second lever 410b. In outboard arrangements the tabs 420 which support the spring could extend from the adjacently arranged armatures 412 such that the coupling mechanism couples the levers via the armatures 412 (e.g., as shown in FIG. 7B). Reference numbers in FIG. 7B refer to correspondingly numbered elements in FIG. 7A.

Figure 8A:
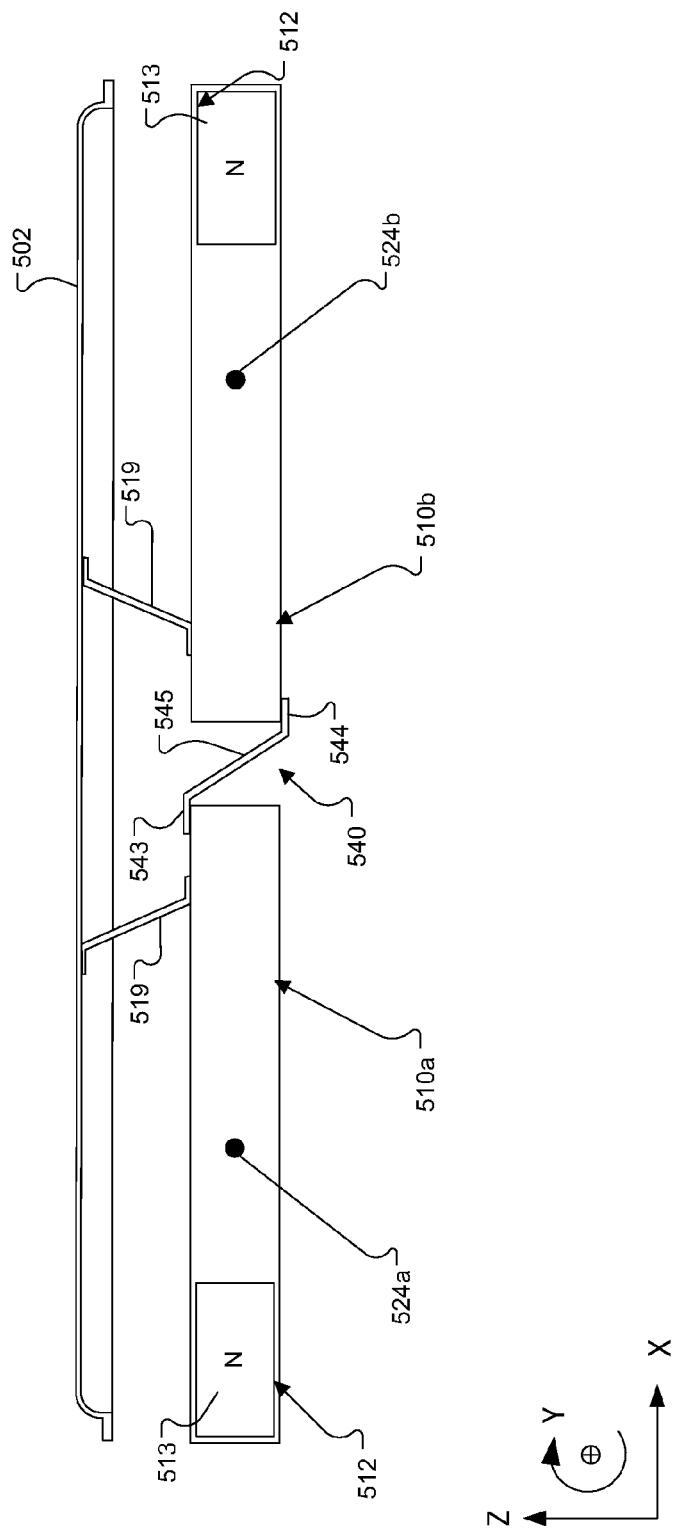
FIG. 8A is a schematic side view of pair of levers which couple a pair of armatures to an acoustic diaphragm and which are coupled together with a coupling mechanism in the form of a flexure.

FIG. 8A illustrates yet another implementation of a coupling mechanism 540 that can be used to slave movements of a pair of levers 510a, 510b. In the implementation illustrated in FIG. 8A, the levers 510a, 510b are configured to pivot about respective pivot axes 524a, 524b. As in the examples described above, the levers 510a, 510b each couple an associated armature 512 with a load (e.g., an acoustic diaphragm 502). Each lever 510a, 510b is connected to the acoustic diaphragm 502 via connector 519, such as a hinge or flexure, which allows the levers 510a, 510b to move relative to the acoustic diaphragm 502, thereby to allow the acoustic diaphragm 502 to move in a pistonic motion, rather than following the arcuate path of the levers 510a, 510b. Permanent magnets 513 of the armatures 512 interact with magnetic flux provided by stators (not shown in FIG. 8A) to drive the motion of the levers 510a, 510b, which, in turn, drive pistonic motion of the acoustic diaphragm 502.

The coupling mechanism 540 includes a flexure that is arranged to inhibit rocking of the acoustic diaphragm 502. In this regard, the coupling mechanism 540 is arranged to encourage common mode oscillation of the levers 510a, 510b and inhibits differential mode oscillation of the levers 510a, 510b. That is, the coupling mechanism 540 slaves the levers 510a, 510b to each other so that the components of the forces applied on the acoustic diaphragm 502 by the levers 510a, 510b in the Z-direction are in phase. In phase force application in the Z-direction at different points on the acoustic diaphragm 502 stimulates desired planar, non-rocking motion of the acoustic diaphragm 502.

Notably, the flexure is arranged so as to provide relatively high stiffness in the Z-direction (so as to inhibit different mode oscillation of the levers 510a, 510b) and relatively low stiffness in the X-direction (so as not to substantially inhibit common mode oscillation of the levers 510a, 510b). The flexure is formed of a flexure material, such as high fatigue strength stainless steel. The flexure includes a first flange 543 that is secured to a top surface of the first lever 510a, a second flange 544 that is secured a bottom surface of the second lever 510b and a flexure section 545 that extends from the first flange 543 to the second flange 544 diagonally across a space between the levers 510a, 510b, such that the flexure couples diagonally opposed surfaces of the levers 510a, 510b.

Figure 8B:
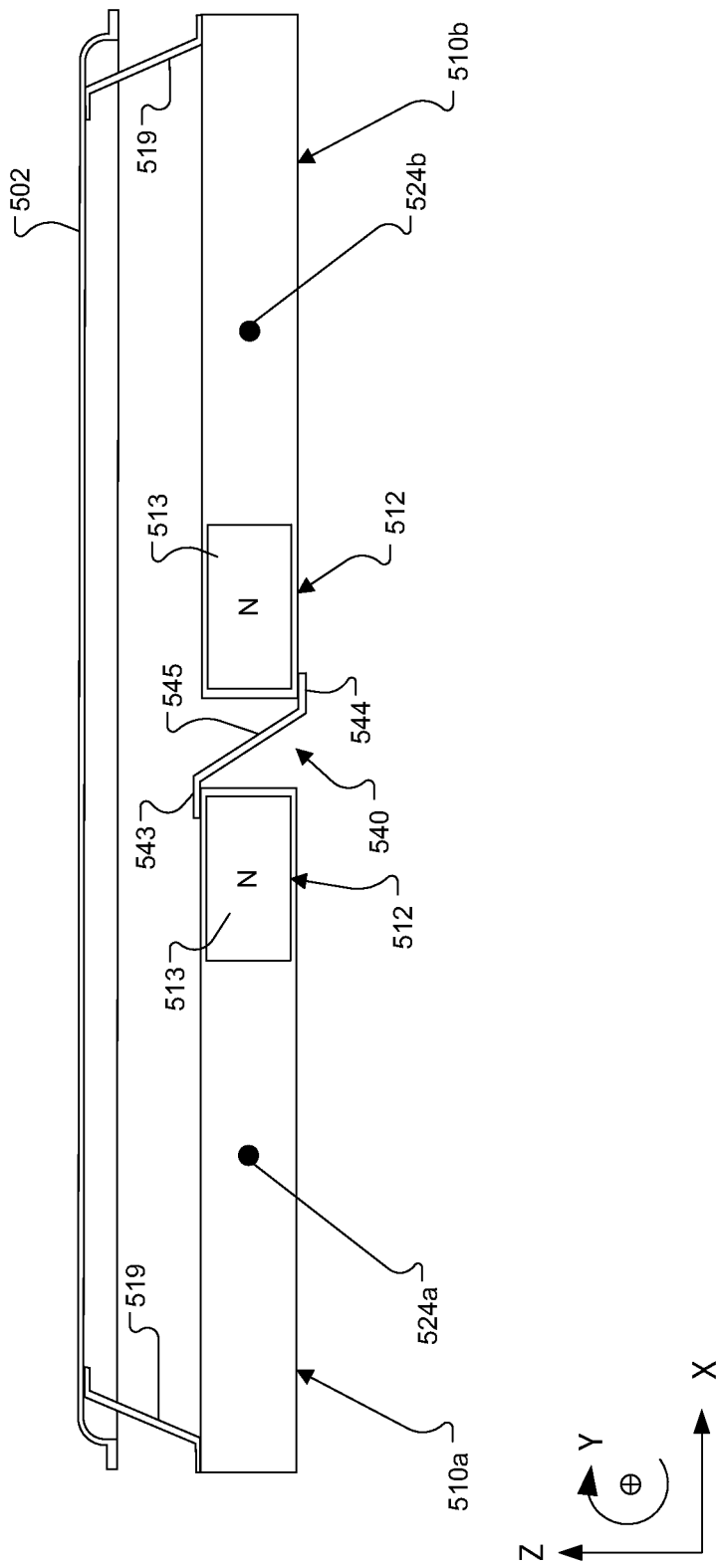
FIG. 8B is a schematic side view of an alternative arrangement of a pair of levers which couple a pair of armatures to an acoustic diaphragm and which are coupled together with a coupling mechanism in the form of a flexure.

While FIG. 8A illustrates an inboard arrangement, in which the pivot axes 524a, 524b are arranged between of the armatures 512, the flexure configuration is also applicable to outboard arrangements in which the armatures 512 are disposed between the pivot axis 524a of the first lever 510a and the pivot axis 524b of the second lever 510b. In outboard arrangements, the first flange 543 can be secured to a top surface of the armature 512 associated with the first lever 510a and the second flange 544 can be secured a bottom surface of the armature 512 associated with the second lever 510b such that the flexure section 545 extends diagonally across a space between the armatures 512 and such that the coupling mechanism 540 couples the levers 510a, 510b via the armatures 512 (e.g., as shown in FIG. 8B). Reference numbers in FIG. 8B refers to correspondingly numbered elements in FIG. 8A.

Figure 9A:
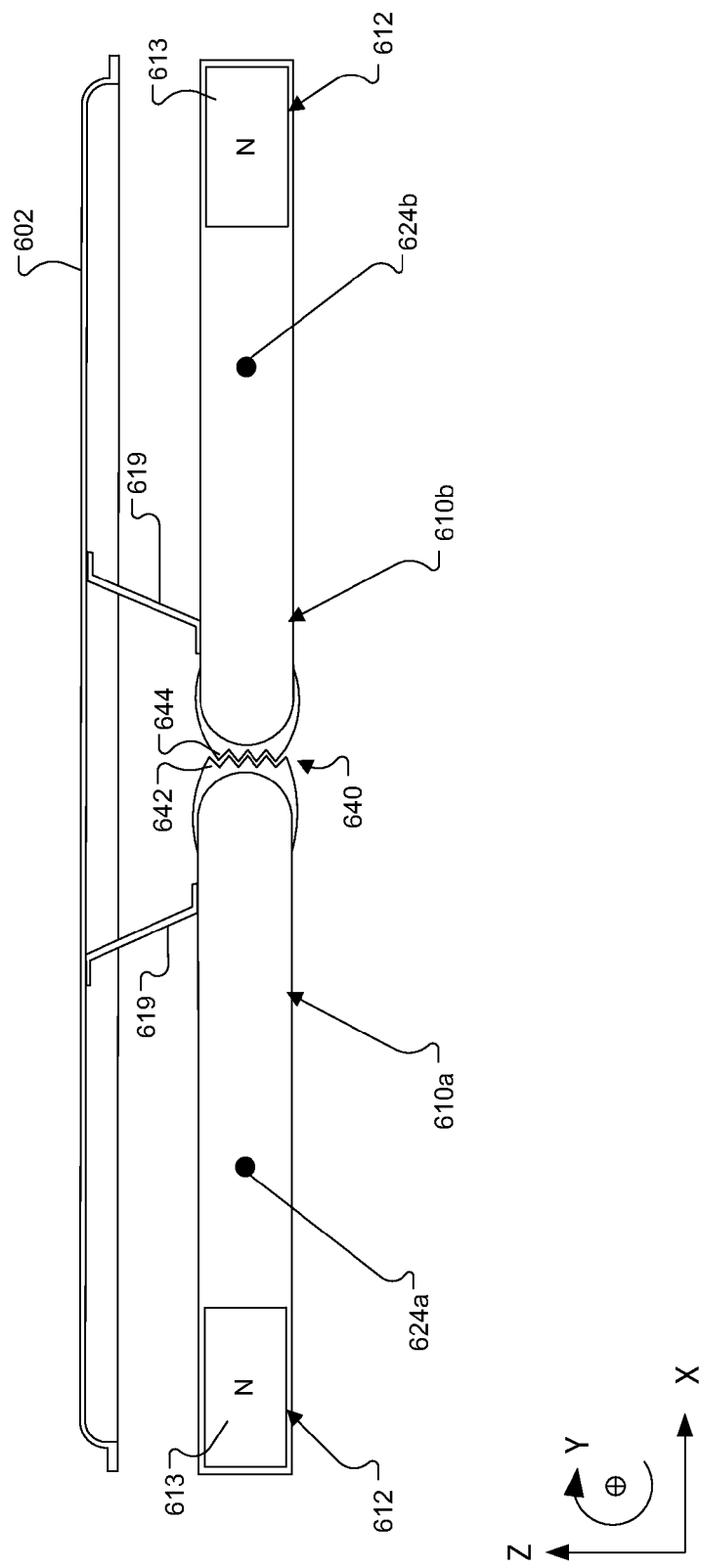
FIG. 9A is a schematic side view of pair of levers which couple a pair of armatures to an acoustic diaphragm and which are coupled together with a gearing mechanism.

FIG. 9A illustrates a further implementation of a coupling mechanism 640 that can be used to slave movements of a pair of levers 610a, 610b. In the implementation illustrated in FIG. 9A, the levers 610a, 610b are configured to pivot about respective pivot axes 624a, 624b. As in the examples described above, the levers 610a, 610b each couple an associated armature 612 with a load (e.g., an acoustic diaphragm 602). Each lever 510a, 510b is connected to the acoustic diaphragm 502 via connector 519, such as a hinge or flexure, which allows the levers 510a, 510b to move relative to the acoustic diaphragm 502, thereby to allow the acoustic diaphragm 502 to move in a pistonic motion, rather than following the arcuate path of the levers 510a, 510b. Permanent magnets 613 of the armatures 612 interact with magnetic flux provided by stators (not shown in FIG. 9A) to drive the motion of the levers 610a, 610b, which, in turn, drive pistonic motion of the acoustic diaphragm 602.

The coupling mechanism 640 is implemented as a gearing mechanism that is arranged to inhibit rocking of the acoustic diaphragm 602. In this regard, the coupling mechanism 640 is arranged to encourage common mode oscillation of the levers 610a, 610b and inhibits differential mode oscillation of the levers 610a, 610b. That is, the coupling mechanism 640 slaves the levers 610a, 610b to each other so that the components of the forces applied on the acoustic diaphragm 602 by the levers 610a, 610b in the Z-direction are in phase. In phase force application in the Z-direction at different points on the acoustic diaphragm 602 stimulates desired planar, non-rocking motion of the acoustic diaphragm 602.

Notably, the coupling mechanism 640 includes a first gear comprising a first plurality of teeth 642 that are connected to a radiused end of the first lever 610a. The coupling mechanism 640 also includes a second gear comprising a second plurality of teeth 644 which are connected to a radiused end of the second lever 610b and which mesh with the first plurality of teeth 642, thereby slaving motion of the first and second levers 610a, 610b. The teeth 642, 644 can be formed (e.g., machined or molded) as integral parts of the levers 610a, 610b.

In some cases, the teeth 642, 644 may be formed out of a relatively soft material, such as an elastomer, and bonded to the levers 610a, 610b. For example, the teeth 642, 644 can be formed directly on the associated levers 610a, 610b in a mold-in-place process. Forming the teeth 642, 644 out of a relatively soft material can help to inhibit audible backlash as the teeth 642, 644 engage and disengage during movement of the levers 610a, 610b.

Figure 9B:
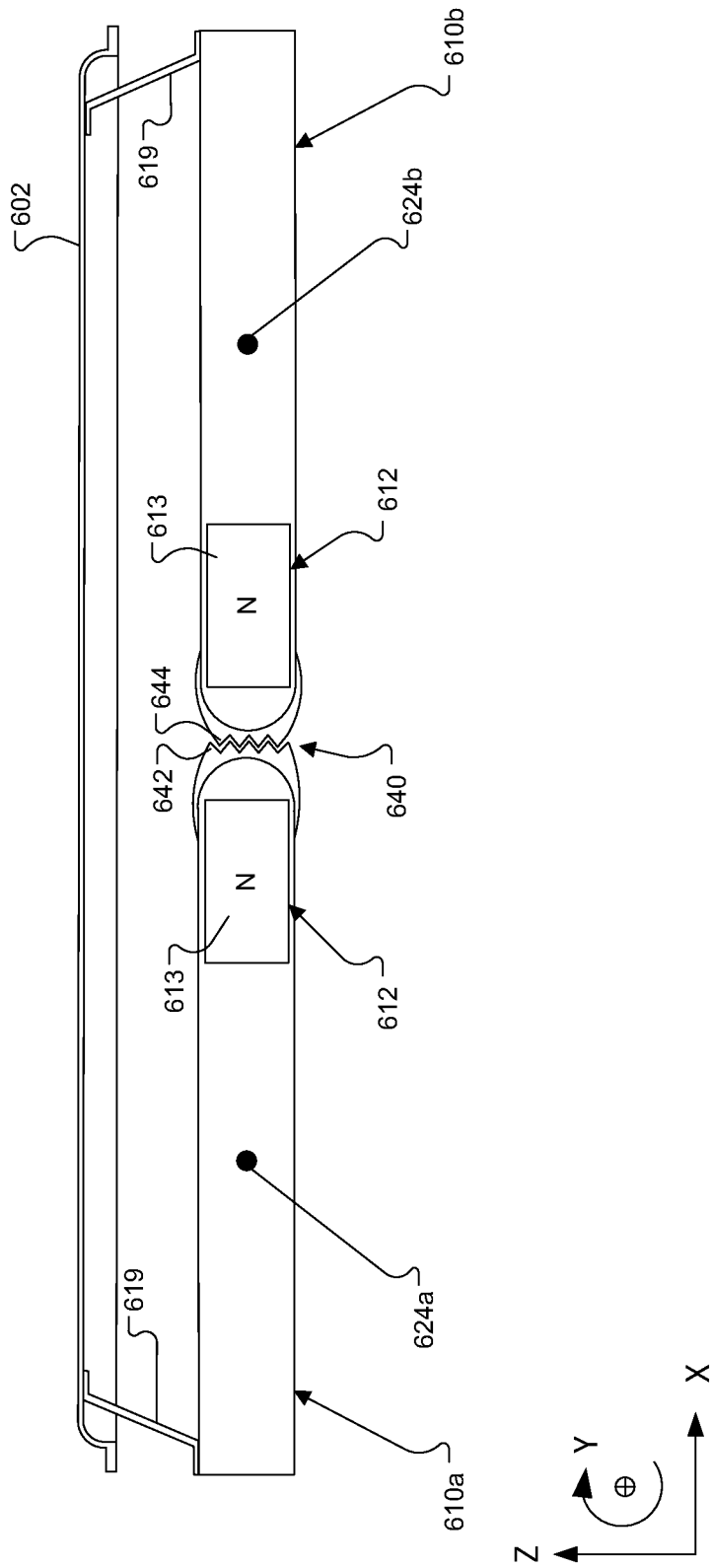
FIG. 9B is a schematic side view of an alternative arrangement of a pair of levers which couple a pair of armatures to an acoustic diaphragm and which are coupled together with a gearing mechanism.

While FIG. 9A illustrates an inboard arrangement, in which the pivot axes 624a, 624b are arranged between of the armatures, the gearing mechanism configuration is also applicable to outboard arrangements in which the armatures 612 are disposed between the pivot axis 624a of the first lever 610a and the pivot axis 624b of the second lever 610a. In outboard arrangements, the teeth 642, 644 can be provide on respective radiused ends of adjacently positioned armatures 612 such that the coupling mechanism couples the levers via the armatures (e.g., as shown in FIG. 9B). Reference numbers in FIG. 9B refers to correspondingly numbered elements in FIG. 9A.

Although implementations have been described in which a coupling mechanism is utilized to couple movements of a pair of levers which drive a common load, some implementations may utilize a coupling mechanism to couple the movements of three or more levers which drive a common load.

A number of implementations have been described. Nevertheless, it will be understood that additional modifications may be made without departing from the spirit and scope of the inventive concepts described herein, and, accordingly, other embodiments are within the scope of the following claims.

What is claimed is:

1. An apparatus comprising:
   a load;
   a first armature;
   a first lever mechanically coupling the first armature and the load and configured such that motion of the first armature causes the first lever to pivot about a first pivot axis;
   a second armature;
   a second lever mechanically coupling the second armature and the load and configured such that motion of the second armature causes the second lever to pivot about a second pivot axis;
   at least one stator for creating magnetic flux for the first and second armatures to interact with, thereby to drive motion of the load; and
   a coupling mechanism coupling the first lever and the second lever,
   wherein the coupling mechanism is arranged to encourage common mode oscillation of the first and second levers and inhibit differential mode oscillation of the first and second levers, thereby to inhibit rocking of the load, wherein the coupling mechanism couples the first and second levers via the first and second armatures.

2. The apparatus of claim 1, wherein the coupling mechanism is secured to the first and second armatures via adhesive, ultrasonic bonding, mechanical interlock, or combinations thereof.

3. The apparatus of claim 1, wherein the coupling mechanism is secured to the first and second armatures via a mold-in-place process.

4. The apparatus of claim 1, wherein the coupling mechanism comprises an elastomer.

5. The apparatus of claim 4, wherein the elastomer is secured to at least two surfaces of the first armature and to at least two surfaces of the second armature.

6. An apparatus comprising:
   a load;
   a first armature;
   a first lever mechanically coupling the first armature and the load and configured such that motion of the first armature causes the first lever to pivot about a first pivot axis;
   a second armature;
   a second lever mechanically coupling the second armature and the load and configured such that motion of the second armature causes the second lever to pivot about a second pivot axis;
   at least one stator for creating magnetic flux for the first and second armatures to interact with, thereby to drive motion of the load; and
   a coupling mechanism coupling the first lever and the second lever,
   wherein the coupling mechanism is arranged to encourage common mode oscillation of the first and second levers and inhibit differential mode oscillation of the first and second levers, thereby to inhibit rocking of the load, wherein the coupling mechanism comprises a coil spring having a first end secured to the first lever and a second end secured to the second lever.

7. The apparatus of claim 6, wherein the levers are configured and arranged for rotation in opposite directions of rotation relative to each other.

8. The apparatus of claim 7, wherein the levers are arranged to move the load in a pistonic motion.

9. The apparatus of claim 6, wherein the apparatus comprises a loudspeaker.

10. The apparatus of claim 6, wherein the load comprises an acoustic diaphragm.

11. The apparatus of claim 6, wherein the at least one stator comprises a first stator for creating magnetic flux for the first armature to interact with, and a second stator for creating magnetic flux for the second armature to interact with.

12. An apparatus comprising:
- a load;
- a first armature;
- a first lever mechanically coupling the first armature and the load and configured such that motion of the first armature causes the first lever to pivot about a first pivot axis;
- a second armature;
- a second lever mechanically coupling the second armature and the load and configured such that motion of the second armature causes the second lever to pivot about a second pivot axis;
- at least one stator for creating magnetic flux for the first and second armatures to interact with, thereby to drive motion of the load; and
- a coupling mechanism coupling the first lever and the second lever,
- wherein the coupling mechanism is arranged to encourage common mode oscillation of the first and second levers and inhibit differential mode oscillation of the first and second levers, thereby to inhibit rocking of the load, wherein the at least one stator comprises a single, common stator defining an air gap within which both of the first and second armatures are disposed, the common stator being configured for creating magnetic flux across the air gap for the first and second armatures to interact with, thereby to drive motion of the load.

* * * * *